United States Patent
Li

(10) Patent No.: US 8,840,133 B2
(45) Date of Patent: Sep. 23, 2014

(54) STROLLER FRAME

(75) Inventor: Jian-Qun Li, Neihu (TW)

(73) Assignee: Wonderland Nurserygoods Company Limited, Central (HK)

( * ) Notice: Subject to any disclaimer, the term of this patent is extended or adjusted under 35 U.S.C. 154(b) by 146 days.

(21) Appl. No.: 13/597,720

(22) Filed: Aug. 29, 2012

(65) Prior Publication Data

US 2013/0106078 A1   May 2, 2013

(30) Foreign Application Priority Data

Oct. 27, 2011   (CN) .......................... 2011 1 0332699

(51) Int. Cl.
*B62B 7/10* (2006.01)
*B62B 7/00* (2006.01)

(52) U.S. Cl.
CPC .. *B62B 7/10* (2013.01); *B62B 7/008* (2013.01)
USPC .......................................... 280/650; 280/658

(58) Field of Classification Search
CPC .......... B62B 7/008; B62B 7/06; B62B 7/064; B62B 7/08; B62B 7/10; B62B 9/20
USPC .................. 280/642–644, 647–650, 657, 658
See application file for complete search history.

(56) References Cited

U.S. PATENT DOCUMENTS

| | | | |
|---|---|---|---|
| 5,709,400 A * | 1/1998 | Bonnier et al. ................ | 280/650 |
| 6,935,652 B2 * | 8/2005 | Fair et al. ...................... | 280/642 |
| 7,311,323 B1 * | 12/2007 | Lan ................................ | 280/642 |
| 7,441,794 B2 * | 10/2008 | Lan ................................ | 280/642 |
| 8,070,179 B2 * | 12/2011 | Pike et al. ...................... | 280/642 |
| 8,371,606 B2 * | 2/2013 | Gower et al. ................. | 280/642 |
| 8,459,665 B2 * | 6/2013 | Sellers et al. .............. | 280/47.38 |
| 8,505,958 B2 * | 8/2013 | Thomas et al. ............... | 280/650 |
| 8,579,319 B2 * | 11/2013 | Hu et al. ....................... | 280/642 |

* cited by examiner

*Primary Examiner* — Katy M Ebner
(74) *Attorney, Agent, or Firm* — Merchant & Gould P.C.

(57) ABSTRACT

A stroller frame includes two handle rods, a chair disposed between the handle rods, two front leg rods, two rear leg rods, two connecting members, and two locking members. An upper end of each of the front leg rods is connected pivotally to the chair. A front end of each of the rear leg rods is connected pivotally to a lower end of a corresponding one of the front leg rods. Each of the connecting members is connected pivotally between one of the rear leg rods and a corresponding one of the handle rods. Each of the locking members is disposed at the rear end of a respective one of the rear leg rods, and the lower end of each of the handle rods is separably connected to a respective one of the locking members.

19 Claims, 11 Drawing Sheets

STROLLER FRAME

CROSS-REFERENCE TO RELATED APPLICATION

This application claims priority of Chinese Application No. 201110332699.8, filed on Oct. 27, 2011.

BACKGROUND OF THE INVENTION

1. Field of the Invention

The present invention relates to a stroller frame, more particularly to a foldable stroller frame.

2. Description of the Related Art

Currently, for practicality and carrying convenience of a stroller, a conventional stroller frame for a stroller is usually designed to be foldable so that the stroller can be unfolded into a state of use and folded into a relatively smaller volume to facilitate transport and storage.

For the stroller provided with the conventional stroller frame, the stroller generally forms an elongated shape after being folded for effectively reducing the space occupied by the stroller during transport and storage. In such a configuration of the stroller provided with the conventional stroller frame, the stroller is unable to stand after being folded, and hence has to be either carried by a user or placed flat on the ground. For the aforementioned nuisance, an additional support mechanism is needed to provide support that enables the folded stroller to stand. However, most present support mechanisms have complicated structures, and hence incur relatively higher cost and are inconvenient to operate.

SUMMARY OF THE INVENTION

Therefore, an object of the present invention is to provide a stroller frame capable of standing after being folded.

Accordingly, a stroller frame of the present invention comprises a pair of handle rods each having a lower end, a first chair disposed between the handle rods, a pair of front leg rods, a pair of rear leg rods, a pair of connecting members, and a pair of locking members.

Each of the front leg rods has a lower end and an upper end that is connected pivotally to the first chair. Each of the rear leg rods has a rear end and a front end that is connected pivotally to the lower end of a corresponding one of the front leg rods. Each of the connecting members is connected pivotally between one of the rear leg rods and a corresponding one of the handle rods. Each of the locking members is disposed at the rear end of a respective one of the rear leg rods, and the lower end of each of the handle rods is separably connected to a respective one of the locking members.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
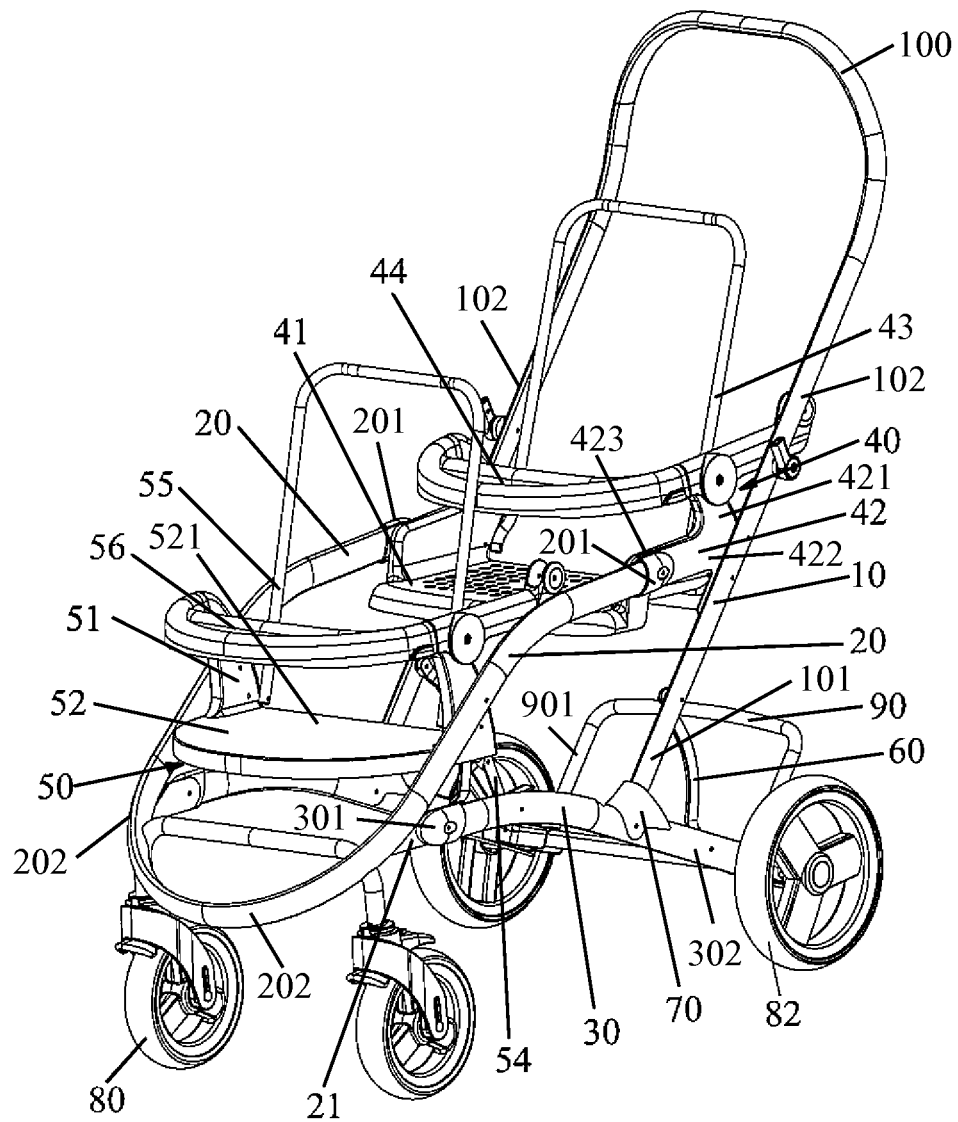
FIG. 1 is a perspective view of the first preferred embodiment of a stroller frame according to the present invention.

Before the present invention is described in greater detail, it should be noted that like elements are denoted by the same reference numerals throughout the disclosure.

Figure 2:
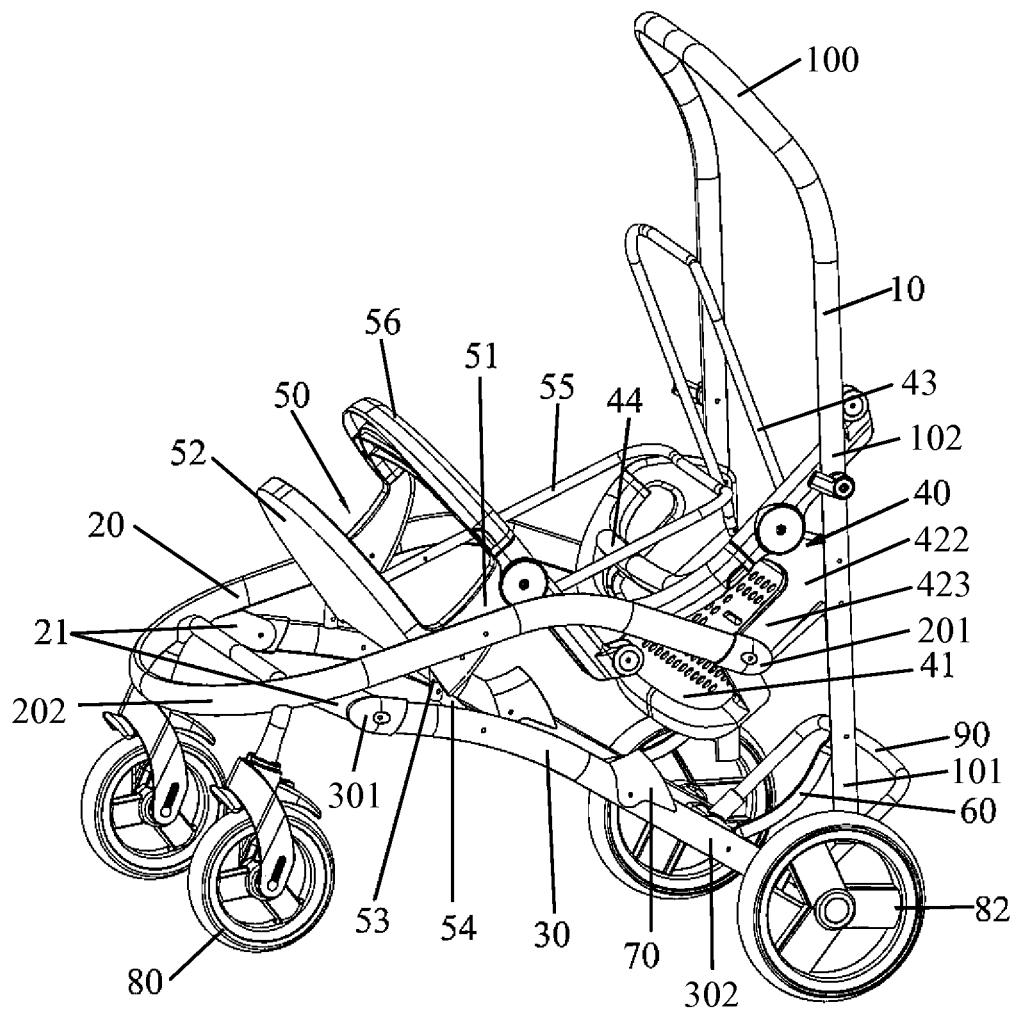
FIG. 2 is another perspective view of the stroller frame of the first preferred embodiment.
Figure 3:
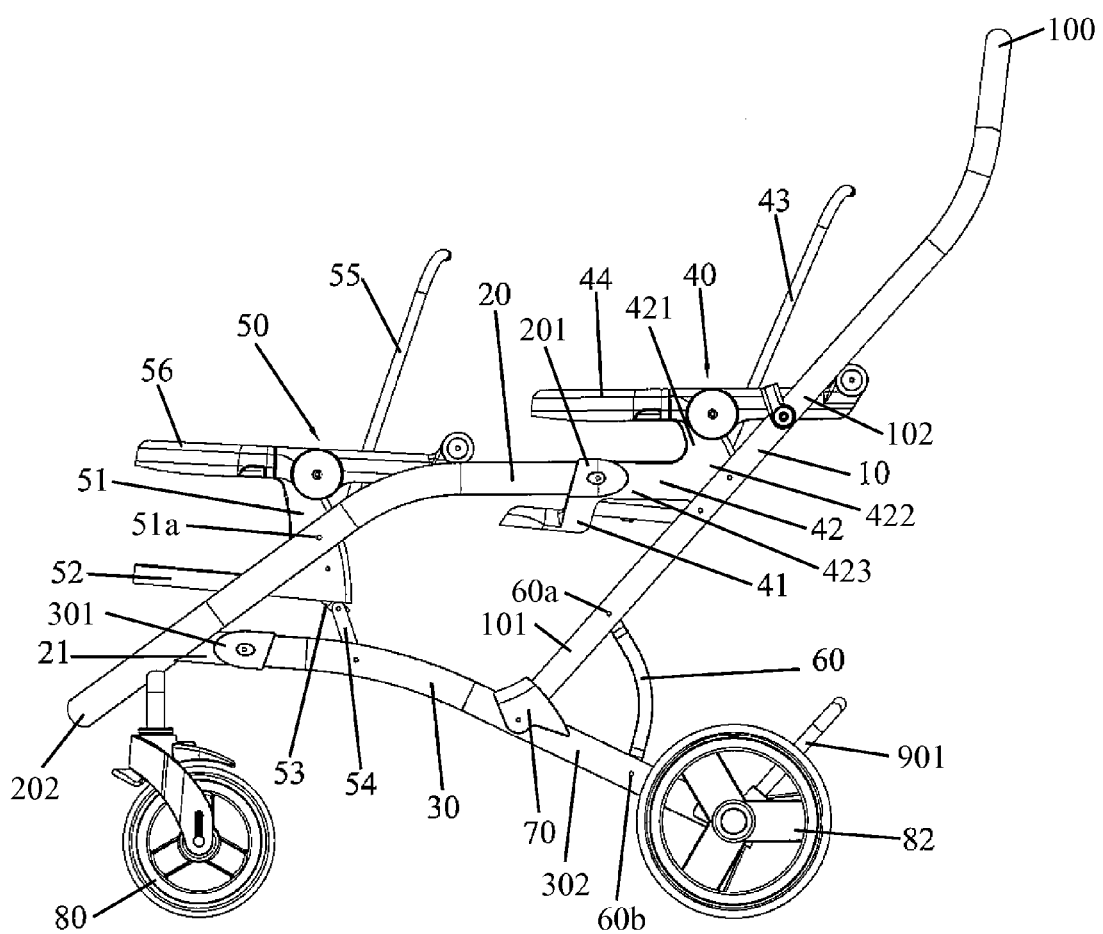
FIG. 3 is a side view of the stroller frame of the first preferred embodiment, where the stroller frame is in an unfolded state.

Referring to FIGS. 1 to 3, the first preferred embodiment of a stroller frame according to the present invention includes a pair of handle rods 10, a pair of front leg rods 20, a pair of rear leg rods 30, and a first chair 40. The handle rods 10 are connected to each other to form a U-shaped structure. Each of the handle rods 10 has an upper end 100 bent slightly and forwardly, a lower end 101, and a middle portion 102 disposed between the upper end 100 and the lower end 101. The first chair 40 is stationarily connected between the middle portions 102 of the handle rods 10, and includes a first seat 41, a pair of connecting parts 42, and a first tray frame 44 parallel to the first seat 41. Each of the connecting parts 42 has an upper end 421 which extends upwardly from a respective lateral side of the seat 41 and which is pivotably connected to the first tray frame 44, a rear end 422 which is stationarily connected to the middle portion 102 of a corresponding one of the handle rods 10, and a front end 423 opposite to the rear end 422. By this configuration, the first seat 41 is disposed between the handle rods 10 and extends forwardly.

Since the stroller frame is bilaterally symmetric, only one of the front leg rods 20 and one of the rear leg rods 30 are described in the following with respect to a corresponding one of the handle rods 10 and a corresponding one of the connecting parts 42 of the first chair 40.

The front leg rod 20 is bent downwardly and extends forwardly, and has an upper end 201 that is connected pivotally to the front end 423 of the connecting part (best shown in FIGS. 2 and 4), and a lower end 202 that extends downwardly and is connected to the lower end 202 of the other front leg rod 20. The lower end 202 of the front leg rod 20 is provided with a respective front wheel 80, and a respective front leg connecting member 21 proximate to the front wheel 80. The rear leg rod 30 has a front end 301 that is connected pivotally to the lower end 202 of the front leg rod 20 through the front leg connecting member 21, and a rear end 302 that is bent slightly and downwardly and that is provided with a respective rear wheel 82. The rear leg rod 30 is separably connected to the lower end 101 of the handle rod 10. In particular, the stroller frame further has a pair of locking members 70, i.e., the rear end 302 of the rear leg rod 30 is provided with a locking member 70 and the lower end 101 of the handle rod 10 is separably connected to and locked by the locking member 70 when the stroller frame is unfolded, i.e., in a state of use.

The stroller frame further includes a pair of connecting members 60 and a carrier 90. Each of the connecting members 60 is connected between the lower end 101 of the handle rod 10 and the rear end 302 of the rear leg rod 30. In particular, the connecting member 60 is curved and bulges backwardly, and includes opposite ends connected pivotally to the handle rod 10 and the rear leg rod 30 at pivot connecting points 60a and 60b, respectively. In particular, the pivot connecting point 60b between the connecting member 60 and the rear leg rod 30 is disposed behind the locking member 70. In practice, the connecting member 60 may have different structures and shapes, and is not limited to the disclosure of this embodiment. The carrier 90 is a U-shaped frame disposed between the rear wheels 82, and includes a pair of lateral rods 901, each of which is stationarily connected to and inclined with respect to the rear end 302 of the rear leg rod 30 and extends parallel to the handle rod 10 when the stroller frame is unfolded.

In this embodiment, the stroller frame further includes a second chair 50 mounted between the front leg rods 20 and spaced apart from the first chair 40 so that a stroller provided with the stroller frame of this embodiment allows two children to sit thereon. The first chair 40 is behind the second chair 50 and is higher than the second chair 50 when the stroller frame is unfolded. The second chair 50 includes a pair of spaced-apart side arms 51, a second seat 52 and a pair of supporting rods 53. In this embodiment, the side arms 51 are integrally formed with and extend upwardly from the second seat 52 at a rear part 521 of the second seat 52. The second chair 50 further includes a second tray frame 56 that is mounted on upper ends of the side arms 51 and that extends parallel to the second seat 52. Each of the side arms 51 is connected pivotally to the front leg rod 20 at a pivot connecting point 51a. The supporting rods 53 are disposed under the second seat 52 for supporting the second seat 52. The second chair 50 further includes a pair of connecting plates 54, each of which is connected pivotally between the rear leg rod 30 and a rear end of a corresponding one of the supporting rods 53. In particular, each of the connecting plates 54 has an upper end connected pivotably to a rear end of the corresponding one of the supporting rods 53, and a lower end connected pivotably to an inner side of the rear leg rod 30. When the stroller frame is unfolded, each of the connecting plates 54 supports the supporting rod 53 over the rear leg rod 30. When the stroller frame is folded, the supporting rod 53 and the connecting plate 54 are pivoted about each other, and the side arm 51 is pivoted about the pivot connecting point 51a relative to the front leg rod 20. As a result, the second chair 50 is pivoted relative to the front leg rod 20.

The first chair 40 further includes a first backrest frame 43 that is mounted on the rear of the first seat and that extends upwardly and rearwardly for supporting a child's back. Moreover, the second chair 50 further includes a second backrest frame 55 that is connected pivotably to the rear part 521 of the second seat 52, that is parallel to the first backrest frame 43, and that extends upwardly and rearwardly for supporting a child's back. When the stroller is incorporated with a child safety seat, the child safety seat engages the first backrest frame 43 between the handle rods 10 and is supported by the first tray frame 44. Similarly, the child safety seat may engage the second backrest frame 55 between the side arms 51 and may be supported by the second tray frame 56.

FIGS. 4 to 8 illustrate a process of folding the stroller frame of this embodiment.

When it is desired to fold the stroller frame, the locking member 70 at the rear leg rod 30 is unlocked by operating a single-hand operating mechanism disposed at the upper end 100 of the handle rod 10 so as to release the handle rod 10. Since the structure and operation of the single-hand operating mechanism are well known to those skilled in the art, details thereof will be omitted herein for the sake of brevity.

Figure 4:
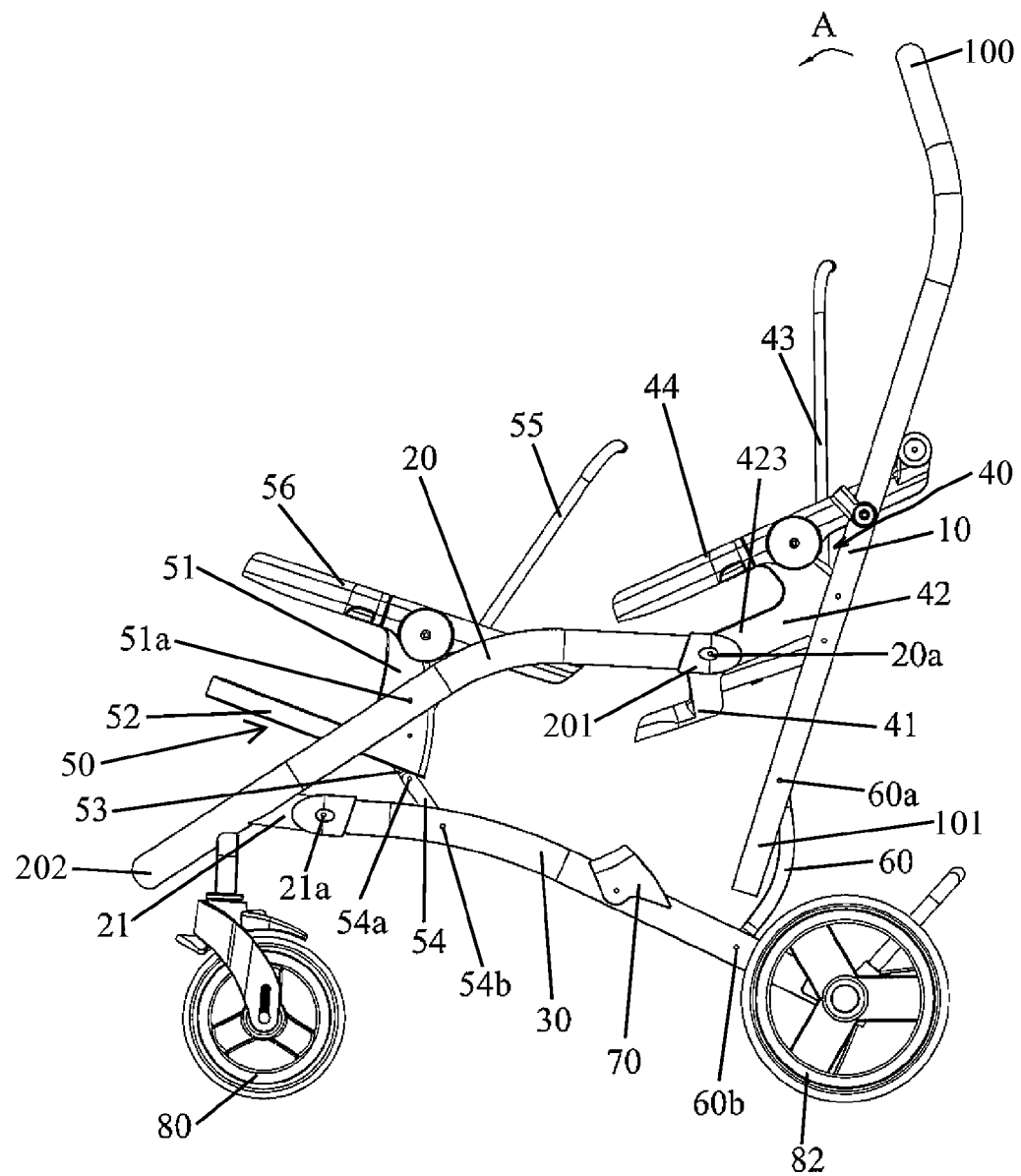
FIGS. 4 to 7 are side views of the stroller frame of the first preferred embodiment for illustrating a process of folding the stroller frame.

Then, as shown in FIG. 4, the upper end 100 of the handle rod 10 is pushed in a direction as shown by an arrow (A) such that the lower end 101 of the handle rod 10 is pivoted about the pivot connecting point 60a. As a result, the lower end 101 of the handle rod 10 is released from the locking member 70 and is rotated rearwardly and upwardly, and drives the connecting member 60 to move rearwardly such that the lower end of the connecting member 60 is pivoted about the pivot connecting point 60b. By continuing to push the handle rod 10 in the direction (A), the first chair 40 stationarily mounted at the handle rod 10 is moved downward accordingly, and the first chair 40 drives the upper end 201 of the front leg rod 20 to move such that the lower end 202 of the front leg rod 20 is pivoted about a pivot connecting point 21a between the rear leg rod 30 and the front leg connecting member 21. When the front leg rod 20 is pivoted downward and the rear end 201 of the front leg rod 20 is moved toward the rear leg rod 30, the upper end 201 of the front leg rod 20 is pivoted about a pivot connecting point 20a between the front leg rod 20 and the first chair 40.

Figure 5:
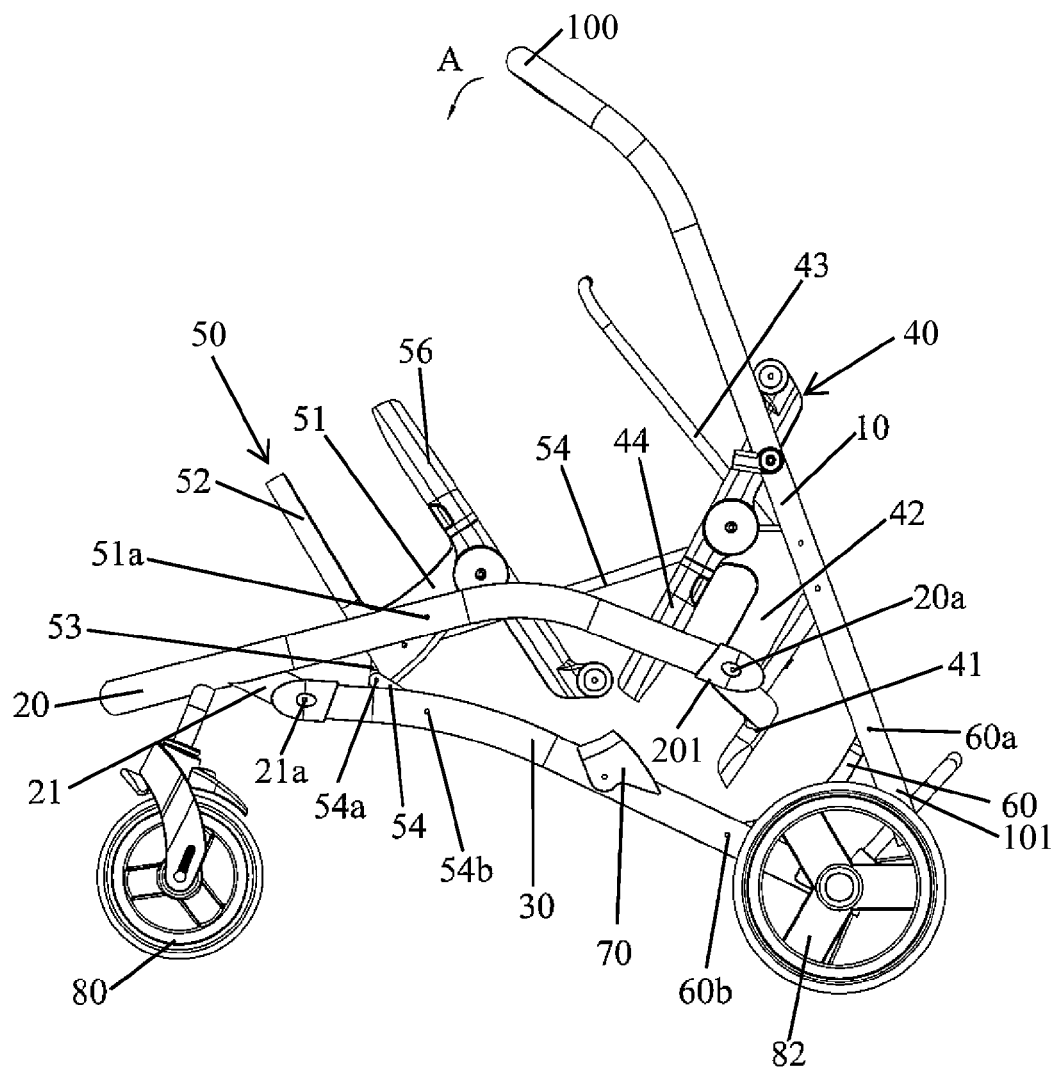

As shown in FIG. 5, when the front leg rod 20 is pivoted downward and the rear end 201 of the front leg rod 20 is moved toward the rear leg rod 30, the second chair 50 is moved downwardly and is rotated slightly and rearwardly such that the rear end of the supporting rod 53 is pivoted about a pivot connecting point 54a between the connecting plate 54 and the supporting rod 53. In particular, when the second chair 50 is rotated slightly and rearwardly, the second chair 50 is pivoted about the pivot connecting point 54a and the upper end of the connecting plate 54 is driven to pivot about a pivot connecting point 54b between the connecting plate 54 and the rear leg rod 30. At the same time, the second chair 50 is also pivoted about a pivot connecting point 51a between the side arm 51 and the front leg rod 20. By virtue of the pivot connecting points 51a and 54a, the second chair 50 is rotated rearwardly to a particular angle (as shown in FIG. 5) and then is rotated frontwardly so that the second seat 52 of the second chair 50 is rotated between 90° and −90°.

Figure 6:
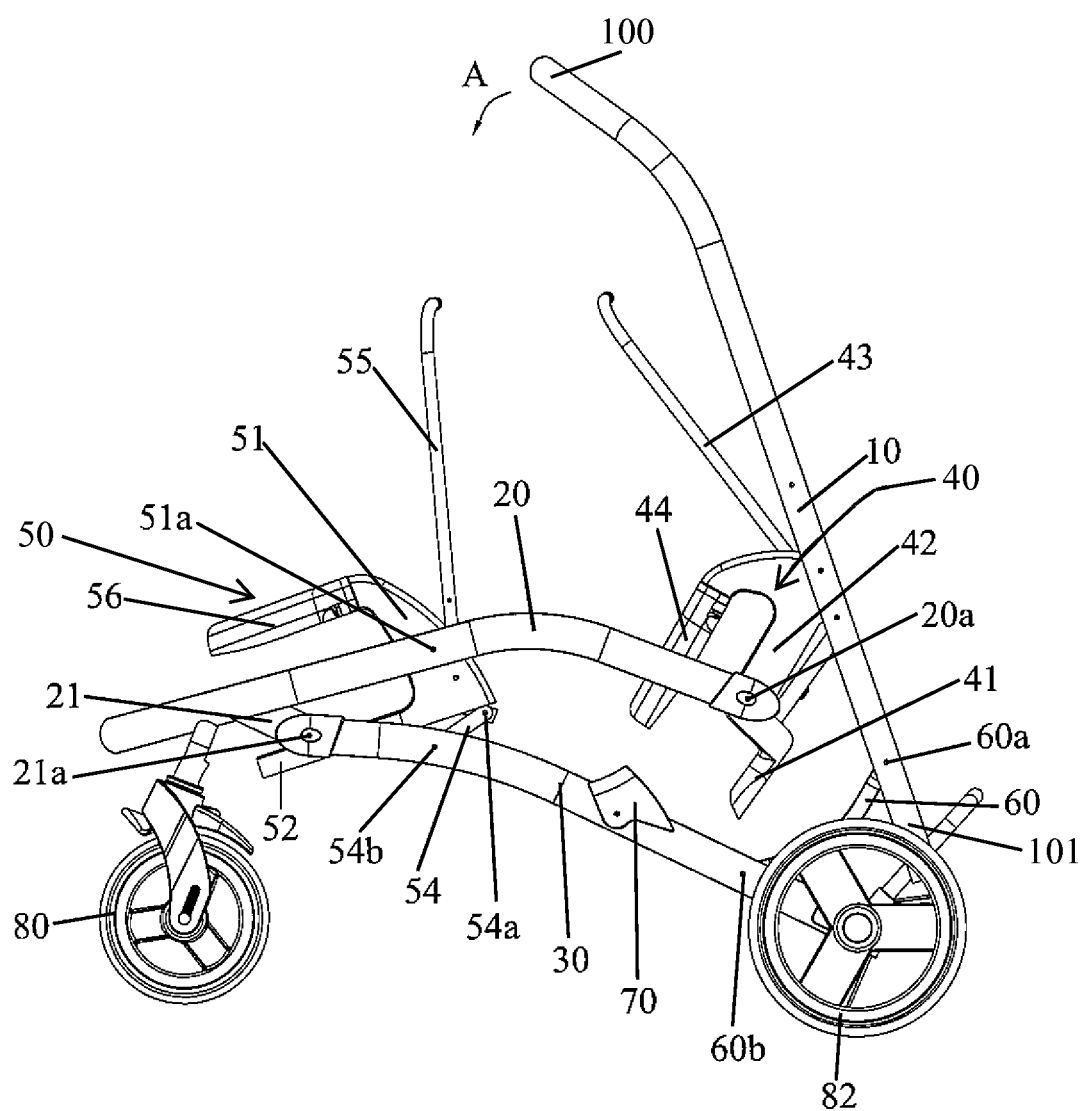
Figure 7:
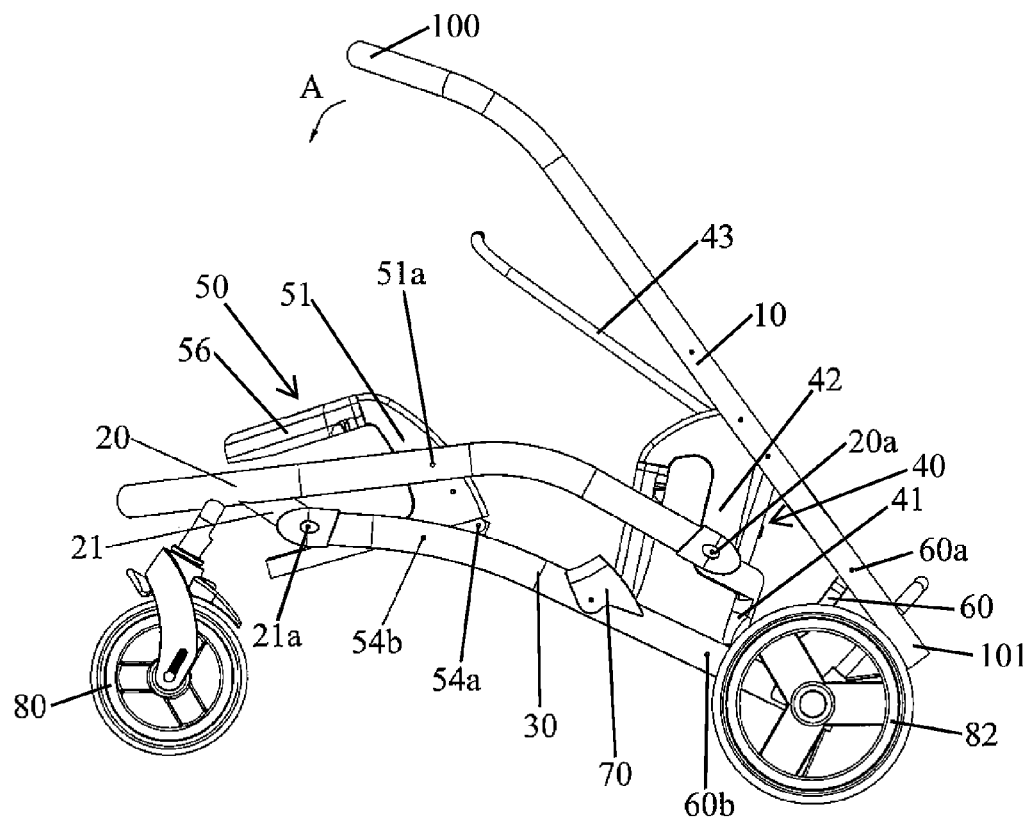
Figure 8:
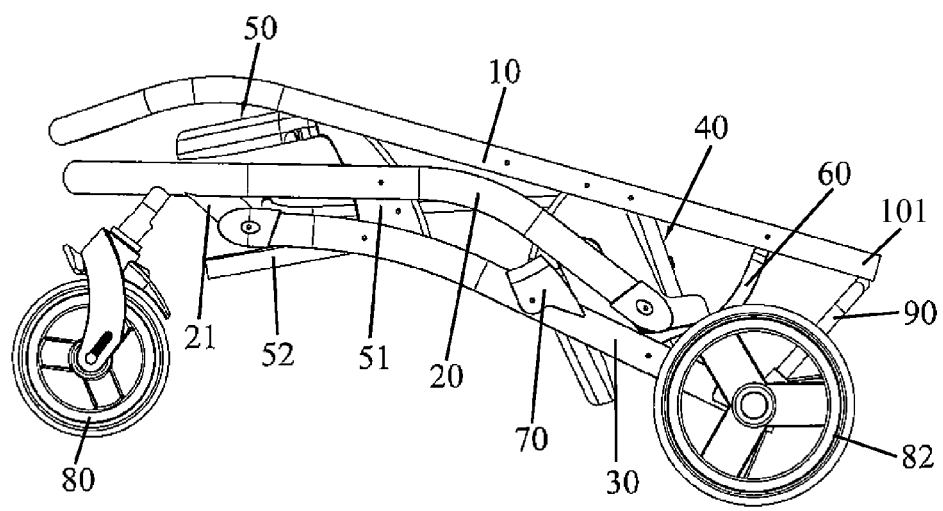
FIG. 8 is a side view of the stroller frame of the first preferred embodiment, where the stroller frame is in a folded state.

As shown in FIG. 6, when the handle rod 10 is continued to be pushed in the direction (A) after the second chair 50 is rotated rearwardly to the particular angle shown in FIG. 5, the lower end 101 of the handle rod 10 is pivoted rearwardly about the pivot connecting point 60a and thus, the lower end of the connecting member 60 continues to pivot about the pivot connecting point 60b. As a result, as shown in FIGS. 6 and 7, the front leg rod 20 is pivoted continually and downwardly toward the rear leg rod 30, and the second chair 50 is pivoted frontwardly about the pivot connecting point 51a and moves the supporting rod 53 and the connecting plate 54 so that the connecting plate 54 is pivoted about the pivot connecting point 54b rearwardly. The connecting plate 54 and the supporting rod 53 are pivoted about each other, and finally the second chair 50 is pivoted about the pivot connecting point 51a to a position proximate to the rear leg rod 30. At this time, as shown in FIG. 8, the stroller frame is folded completely, and the handle rod 10, the front leg rod 20 and the rear leg rod 30 are disposed proximate to one another.

Moreover, since the carrier 90 is stationarily disposed between the rear wheels 82 and forms an angle with the rear leg rods 30, the carrier 90 can cooperate with the rear wheels 82 to support the stroller frame to stand, which increases significantly convenience for transport and storage. In the case where the carrier 90 is omitted, the stroller frame may be supported to stand by the lower end 101 of the handle rod 10 together with the rear wheels 82.

Referring to FIGS. 9 to 13, the second preferred embodiment of a stroller frame according to this invention is described in the following.

Figure 9:
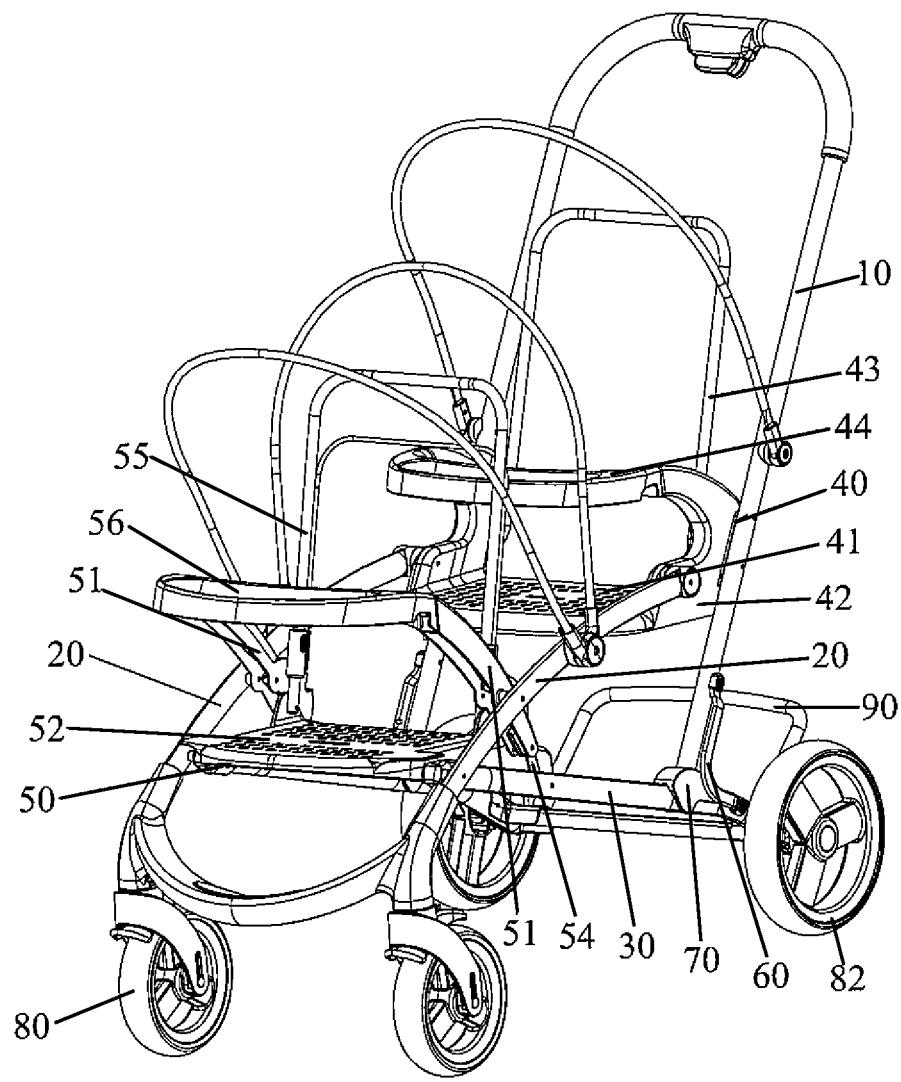
FIG. 9 is a perspective view of the second preferred embodiment of a stroller frame according to the present invention.
Figure 10:
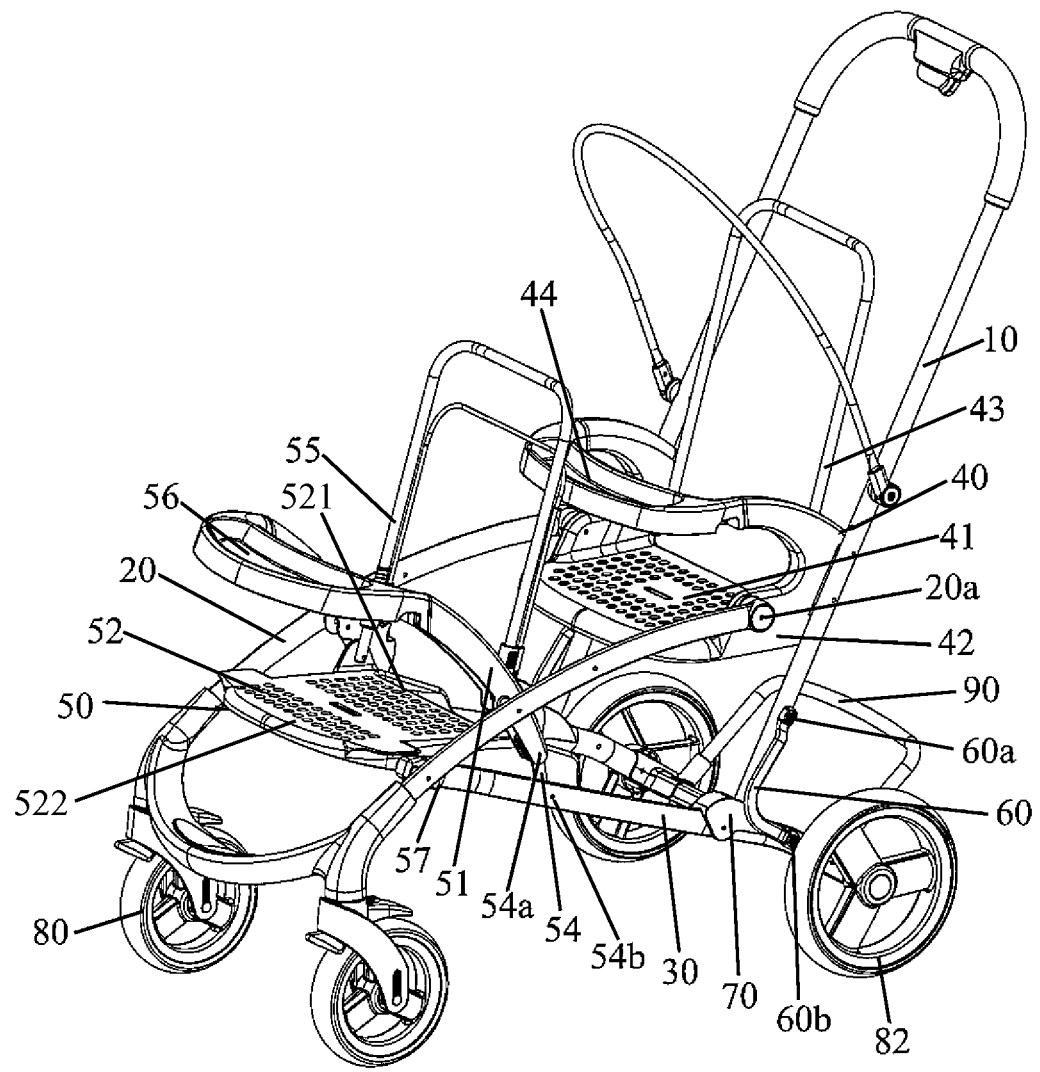
FIG. 10 is another perspective view of the stroller frame of FIG. 9 viewed from a different view angle.
Figure 11:
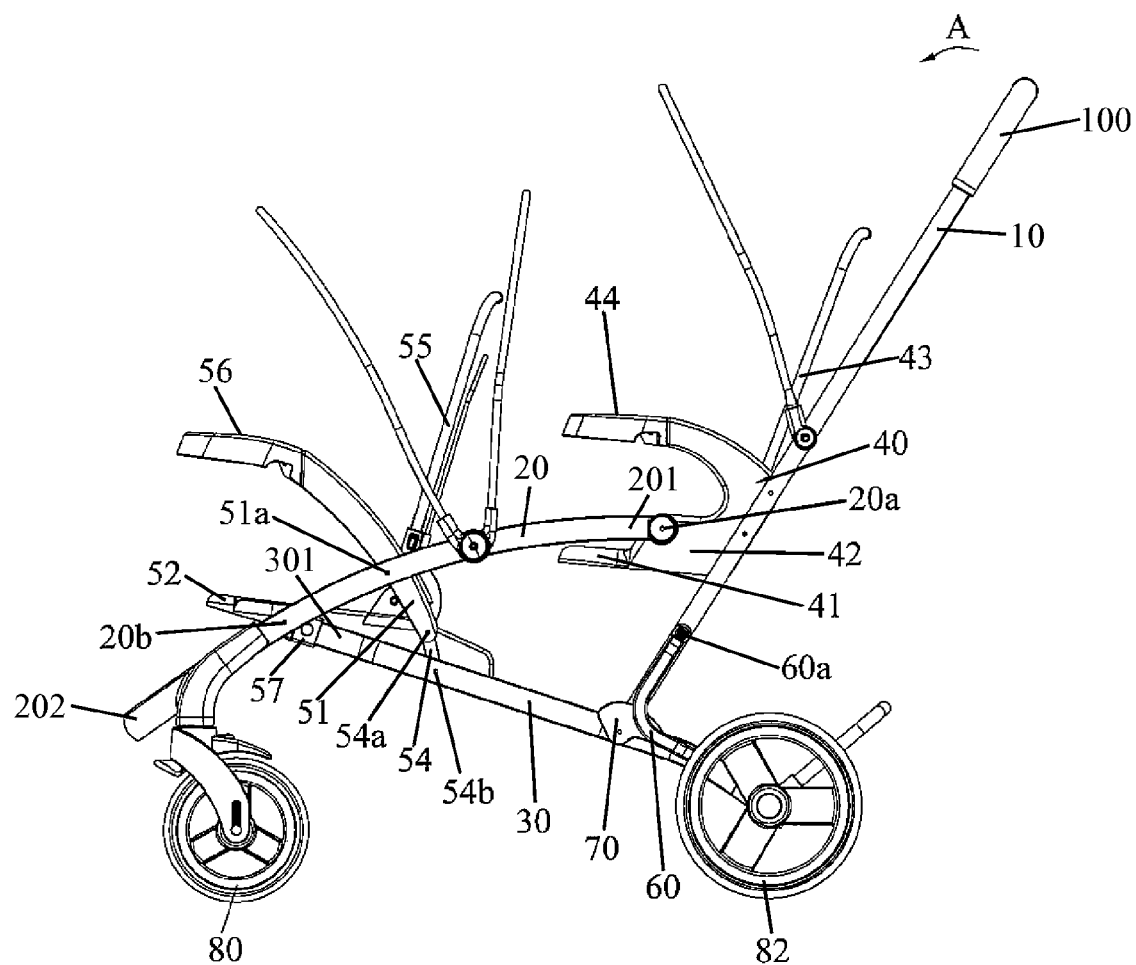
FIG. 11 is a side view of the stroller frame of the second preferred embodiment, where the stroller frame is in an unfolded state.

As shown in FIGS. 9 to 11, in this embodiment, the structure of the second chair 50 of the stroller frame and connection between the front leg rod 20 and the rear leg rod 30 are different from those of the first preferred embodiment. As a result, the folding process of the stroller frame of this embodiment is also different.

In this embodiment, the side arms 51 of the second chair 50 are connected pivotably to the rear part 521 of the second seat 52 and extend upwardly and frontwardly from the second seat 52. The second tray frame 56 is mounted on upper ends of the side arms 51 and extends generally parallel to the second seat 52. The second chair 50 further includes a pair of connecting plates 54 connected pivotally between the rear ends of the side arms 51 and the rear leg rods 30, respectively. In particular, each of the connecting plates 54 has an upper end connected pivotably to the rear end of the second seat 52 as well as the rear end of the corresponding side arm 51 at a same pivot connecting point 54a, and a lower end connected pivotably to an inner side of the corresponding rear leg rod 30 at a pivot connecting point 54b proximate to the front end 301 of the rear leg rod 30. Moreover, the second chair 50 further includes a pair of sliding blocks 57, each of which is slidably sleeved on the front end 301 of a corresponding one of the rear leg rods 30 and is connected pivotally to a front part 522 of the second seat 52. When the stroller frame is unfolded, the connecting plates 54 support the side arms 51 over the rear leg rods 30, and the sliding blocks 57 are disposed at the forefront of the front ends 301 of the rear leg rods 30. When the stroller frame is folded, the side arms 51 and the connecting plates 54 are pivoted about each other, and the sliding blocks 57 are slid rearwardly along the rear leg rods 30. At this time, the side arms 51 are pivoted about the pivot connecting points 51a relative to the front leg rods 20 such that the side arms 51 are moved toward the second seat 52.

Moreover, each of the connecting members 60 of this embodiment is L-shaped and includes opposite ends pivotally connected to the one of the rear leg rods 30 and the corresponding one of the handle rods 10, respectively. When the stroller frame is unfolded, an angle between the handle rod 10 and the rear leg rod 30 corresponds to an angle formed by the L-shaped structure of the connecting member 60. Namely, the handle rod 10 extends along one segment of the connecting member 60, and the front leg rod 20 extends along another segment of the connecting member 60.

Figure 12:
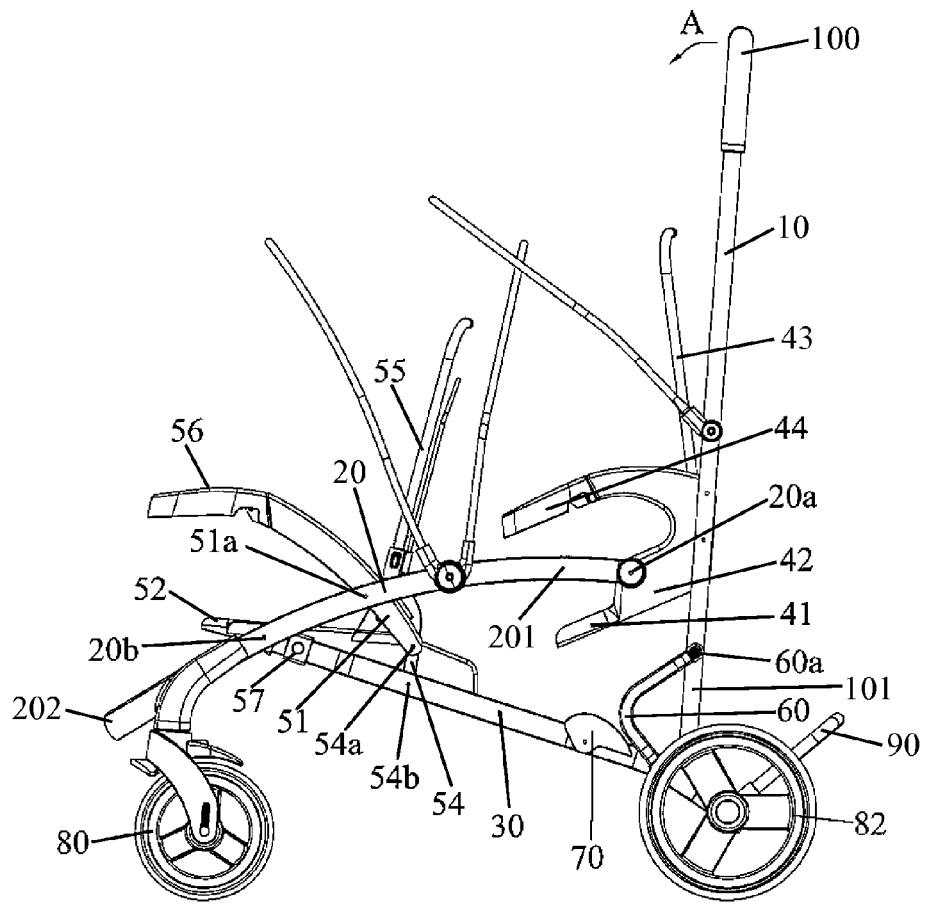
FIG. 12 is a side view of the stroller frame of the second preferred embodiment for illustrating a process of folding the stroller frame.
Figure 13:
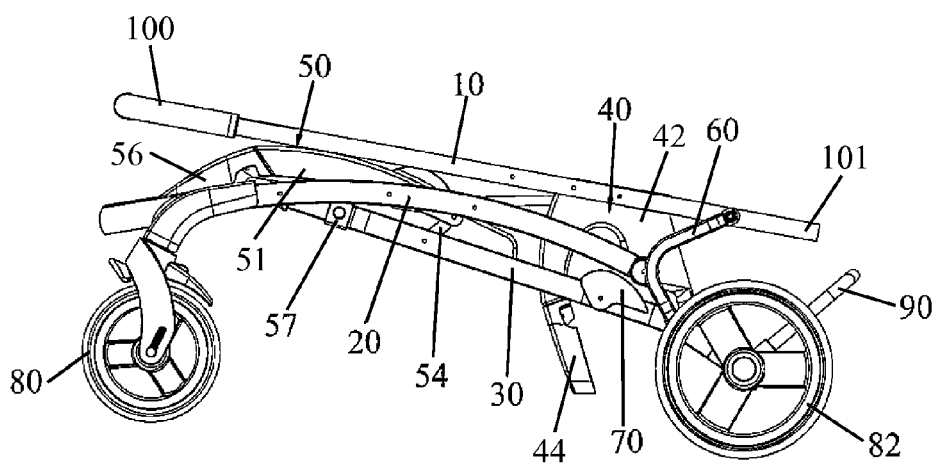
FIG. 13 is a side view of the stroller frame of the second preferred embodiment, where the stroller frame is in a folded state.

Referring to FIGS. 11 to 13, the progress of folding the stroller frame of the second preferred embodiment is described in the following.

When it is desired to fold the stroller frame, the locking member 70 at the rear leg rod 30 is unlocked to release the lower end 101 of the handle rod 10 in a manner similar to the first preferred embodiment. Then, the upper end 100 of the handle rod 10 is pushed in the direction (A) in FIG. 11, such that the lower end 101 of the handle rod 10 is pivoted about the pivot connecting point 60a between the handle rod 10 and the connecting member 60. As a result, the lower end 101 of the handle rod 10 is released from the locking member 70 and is moved rearwardly so as to move the connecting member 60 to pivot about the pivot connecting point 60b between the rear leg rod 30 and the connecting member 60. When continuing to push the handle rod 10 to pivot about the pivot connecting point 60a, the first chair 40 is moved downward accordingly so as to move the upper end 201 of the front leg rod 20 frontwardly and downwardly such that the lower end 202 of the front leg rod 20 is pivoted about the pivot connecting point 20a between the rear leg rod 30 and the front leg rod 20. When the front leg rod 20 is pivoted downwardly and is moved toward the rear leg rod 30, the side arm 51 is moved to pivot about the connecting plate 54 and to pivot about the pivot connecting point 51a between the side arm 51 and the front leg rod 20. Accordingly, the lower end of the connecting plate 54 is pivoted frontwardly about the pivot connecting point 54b, and the side arm 51 is also pivoted frontwardly about the pivot connecting point 51a such that the side arm 51 is pivoted downwardly about the pivot connecting point 51a to move toward the second seat 52. At this time, the sliding block 57 is slid rearwardly along the front leg rod 20 as shown in FIG. 12.

Then, when the upper end 100 of the handle rod 10 is pushed continuously in the direction (A), the lower end 101 of the handle rod 10 is pivoted rearwardly about the pivot connecting point 60a, and the lower end of the connecting member 60 is pivoted about the pivot connecting point 60b accordingly. As a result, the front leg rod 20 is pivoted downwardly continuously and is moved toward the rear leg rod 30, and the side arm 51 is pivoted about and moved toward the second seat 52 until the side arm 51 is most proximate to the second seat 52 and the stroller frame is folded completely as shown in FIG. 13. When the stroller frame is folded completely as shown in FIG. 13, the handle rod 10, the front leg rod 20 and the rear leg rod 30 are disposed most proximate to one another. By virtue of the carrier 90 and the rear wheels 82, the folded stroller frame can be supported to stand.

To sum up, by virtue of the upper ends 201 of the front leg rods 20 connected pivotally to the first chair 40, the lower ends 202 of the front leg rods 20 connected pivotally to the front ends 301 of the rear leg rods 30, and the locking members 70 mounted on the rear ends 302 of the rear leg rods 30, the lower ends 101 of the handle rods 10 can removably contact the rear leg rods 30 and the rear leg rods 30 and the handle rods 10 are pivotably connected to each other through the connecting members 60. In such a manner, when the stroller frame is unfolded in the state of use, the lower ends 101 of the handle rods 10 are connected to and locked by the locking members 70, and the connecting members 60 make support between the handle rods 10 and the rear leg rods 30. When the stroller frame is folded, the locking members 70 release the handle rods 10, and the lower ends 101 of the handle rods 10 are pivoted about the connecting members 60 to a predetermined position to push the front leg rods 20 to pivot about and move toward the rear leg rods 30 until the stroller frame is folded completely. The folded stroller frame occupies a relatively smaller volume and hence is handy for transport and storage. Moreover, by virtue of the carrier 90 between the rear leg rods 30, the folded strolled can be supported to stand by the carrier 90 and the rear wheels 82. Thus, there is no additional support mechanism needed for supporting the folded stroller frame to stand.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A stroller frame, comprising:
a pair of handle rods each of which has a lower end;

a first chair disposed between said handle rods;

a pair of front leg rods each of which has a lower end and an upper end that is connected pivotally to said first chair;

a pair of rear leg rods each of which has a rear end and a front end that is connected pivotally to said lower end of a corresponding one of said front leg rods;

a pair of connecting members each of which is connected pivotally between one of said rear leg rods and a corresponding one of said handle rods; and a pair of locking members each of which is disposed at said rear end of a respective one of said rear leg rods, said lower end of each of said handle rods being separably connected to a respective one of said locking members.

2. The stroller frame as claimed in claim 1, wherein each of said connecting members is curved and bulges backwardly, and includes opposite ends connected pivotally to said one of said rear leg rods and said corresponding one of said handle rods, respectively.

3. The stroller frame as claimed in claim 1, wherein each of said connecting members is L-shaped, and includes opposite ends connected pivotally to said one of said rear leg rods and said corresponding one of said handle rods, respectively.

4. The stroller frame as claimed in claim 1, wherein each of said locking members is disposed in front of a corresponding one of said connecting members, and said lower end of each of said handle rods is locked by said respective one of said locking members when said stroller frame is in a state of use.

5. The stroller frame as claimed in claim 4, wherein, when said locking members release said handle rods, each of said handle rods is user-operable to separate from said respective one of said locking members and to pivot on said corresponding one of said connecting members.

6. The stroller frame as claimed in claim 1, wherein said first chair includes a first seat and a pair of connecting parts which extend upwardly and respectively from lateral sides of said first seat, each of said connecting parts having a rear end stationarily connected to one of said handle rods and a front end connected pivotally to said upper end of a corresponding one of said front leg rods.

7. The stroller frame as claimed in claim 1, further comprising a second chair including a second seat that has a rear part, and a pair of spaced-apart side arms each of which is stationarily connected to said rear part and each of which is connected pivotally to a corresponding one of said front leg rods.

8. The stroller frame as claimed in claim 7, wherein said second chair further includes a pair of supporting rods disposed under said second seat for supporting said second seat.

9. The stroller frame as claimed in claim 8, wherein said second chair further includes a pair of connecting plates connected pivotally between said supporting rods and said rear leg rods, respectively.

10. The stroller frame as claimed in claim 9, wherein said connecting plates respectively support said supporting rods over said rear leg rods when said stroller frame is in a state of use, and are pivotable respectively with respect to said supporting rods during folding of said stroller frame.

11. The stroller frame as claimed in claim 9, wherein said connecting plates are connected pivotally between said supporting rods and said rear leg rods, respectively, such that said second chair is rotatable rearward to an angle and then is rotatable frontward during folding of said stroller frame.

12. The stroller frame as claimed in claim 7, wherein said second chair further includes a back portion connected pivotally to said rear part of said second seat and extending upwardly therefrom.

13. The stroller frame as claimed in claim 1, further comprising a second chair including a second seat that has a rear part, and a pair of spaced-apart side arms each of which is connected pivotally to said rear part and each of which is connected pivotally to a corresponding one of said front leg rods.

14. The stroller frame as claimed in claim 13, wherein said second chair further includes a pair of connecting plates connected pivotally between said side arms and said rear leg rods, respectively.

15. The stroller frame as claimed in claim 14, wherein said second seat of said second chair further has a front part, and said second chair further includes a pair of sliding blocks which are connected pivotally to said front part, each of said sliding blocks being slidably sleeved on said front end of a corresponding one of said rear leg rods.

16. The stroller frame as claimed in claim 13, wherein said second chair further includes a back portion connected pivotally to said rear part of said second seat and extending upwardly therefrom.

17. The stroller frame as claimed in claim 1, further comprising a carrier stationarily connected to said rear leg rods.

18. The stroller frame as claimed in claim 17, wherein said carrier is a U-shaped frame and includes a pair of lateral rods each of which is stationarily connected to and inclined with respect to said rear end of a corresponding one of said rear leg rods.

19. The stroller frame as claimed in claim 1, wherein one of said handle rods is user-operable to allow said locking members to release said lower ends of said handle rods.

* * * * *